Nov. 25, 1958    J. J. CAUBET    2,861,502
DEVICES FOR CUTTING AND GENERATING HYPOCYCLOIDAL GEARS
Filed Sept. 25, 1956    2 Sheets-Sheet 1
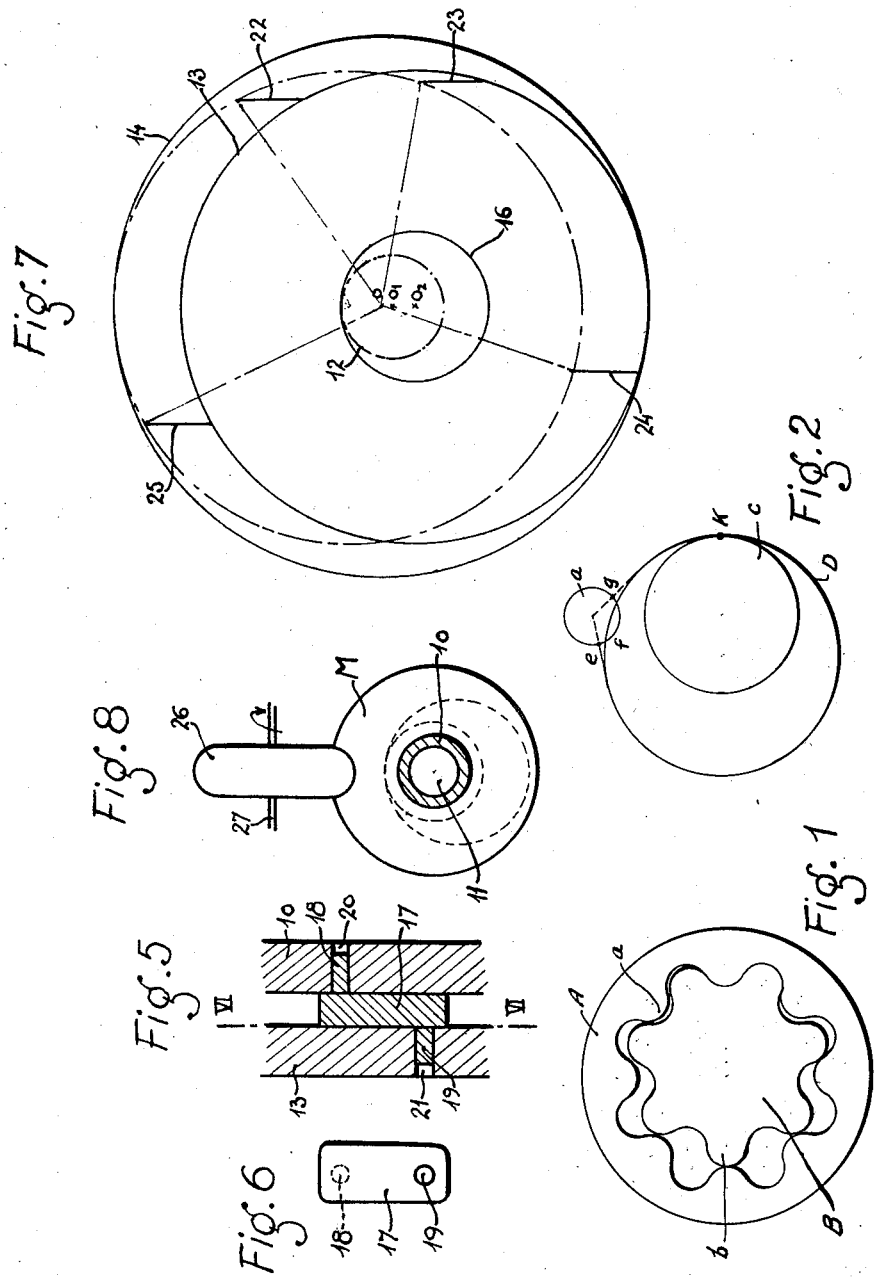
INVENTOR
JACQUES JEAN CAUBET
BY Young, Emery & Thompson
ATTYS Nov. 25, 1958  J. J. CAUBET  2,861,502
DEVICES FOR CUTTING AND GENERATING HYPOCYCLOIDAL GEARS
Filed Sept. 25, 1956  2 Sheets-Sheet 2

INVENTOR
JACQUES JEAN CAUBET
BY Young, Emery & Thompson
ATTYS.

United States Patent Office 2,861,502
Patented Nov. 25, 1958

---

2,861,502

DEVICES FOR CUTTING AND GENERATING HYPOCYCLOIDAL GEARS

Jacques Jean Caubet, Saint-Chamond, France

Application September 25, 1956, Serial No. 611,909

Claims priority, application France October 11, 1955

2 Claims. (Cl. 90—3)

The present invention relates to the cutting and generation of hypocycloidal gears, of the type comprising an external gear with $m$ teeth, with which engages an internal gear having $m-1$ teeth, each tooth of the internal gear being tangential at every instant to one tooth and one tooth only of the external gear.

One of the features of the invention consists of a device for cutting gears of the kind referred to above, in which with a tool having a simple straight line movement, the cutting of the teeth of the gears is effected by an appropriate movement of the support of the blank to be cut.

A further special feature resides in a blank support which imparts to the said blank a movement with respect to the cutting tool which is in conformity with the real development of the teeth to be cut.

The invention will be explained in greater detail below, reference being made to the accompanying drawings, in which:

Fig. 1 is a diagrammatic representation of the hypocycloidal gears to be cut.

Fig. 2 is an explanatory diagram showing the method of generation of the gears of the kind shown in Fig. 1.

Fig. 5 is a detail view in cross-section of a coupling crank-arm.

Fig. 6 is a side view in profile taken along the line VI—VI of Fig. 5.

Fig. 7 is a view showing the diagrammatic arrangement of the coupling crank-arms, taken along the line VII—VII of Fig. 4.

Fig. 8 is a view in cross-section taken along the line VIII—VIII of Fig. 4.

Figure 4:
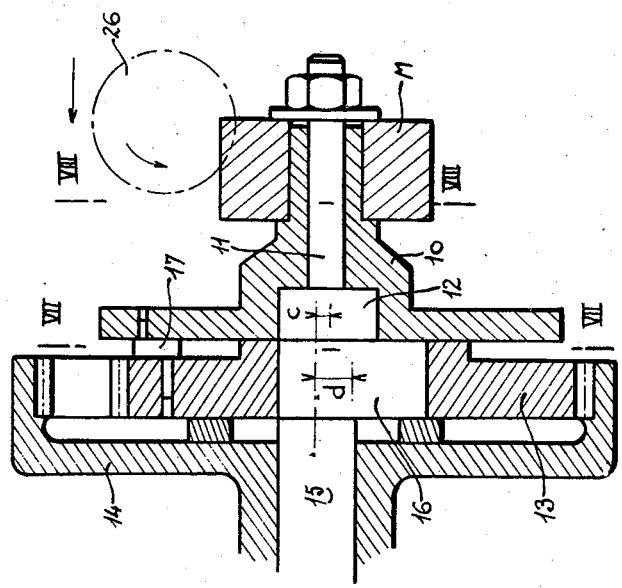
Fig. 4 is a view in cross-section of the driving member for the blank.
Figure 3:
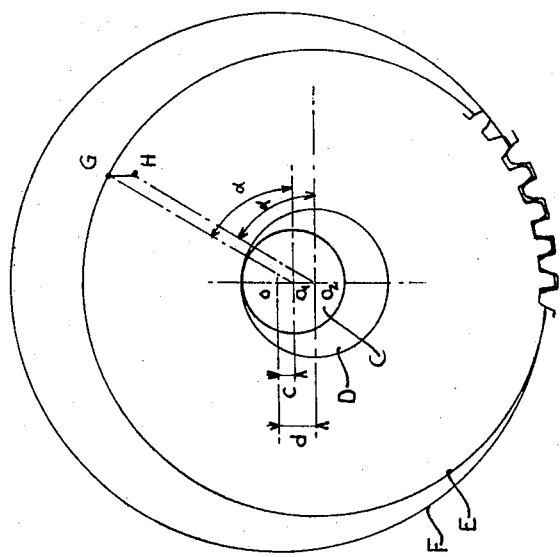
Fig. 3 is a diagrammatic representation of the control of the movement of the work-piece to be cut, in accordance with the present invention.

The hypocycloidal gears to which the invention relates are constituted by an external gear A having a set of teeth $a$ with $m$ teeth, with a circular or other form of profile, and by an internal gear B having a set of teeth $b$ with $m-1$ teeth. The teeth $b$ roll over the teeth $a$ in such manner that at every instant each tooth of B is tangential with one tooth of A and one only, thus forming between the teeth a series of closed cells which are practically fluid-tight.

A gear of this kind may be generated in the following manner:

The pitch-circle C of the internal gear B (see Fig. 2) rolls without sliding on the inside of the pitch-circle D of the external gear A, the ratio of the diameters of the pitch-circles being $$\frac{m-1}{m}$$

In this movement, the internal gear B is defined as the envelope of a circle $a$, the centre of which is outside the pitch-circle D. The external gear is defined by the pattern $a$ repeated $m$ times.

The most elementary physical method of constructing these conjugate curves consists in forming the circle $a$ of a tool, milling cutter or grinding wheel, of the same dimensions and located in the same position, rotating about its axis of rotation, the work-piece to be cut being driven by the rolling of two gears having pitch-circles equal to the pitch-circles C and D.

This form of construction has however three serious drawbacks:

(1) The construction of two involute gears having pitch-circles C and D may be impossible, on the one hand for too-small values of C and D, and on the other hand for too-high values of the ratio $$\frac{m-1}{m}$$

(2) The precision of the finished piece cannot be higher than that of the driving gears, which is often insufficient.

(3) A further drawback arises from the tool which materially forms the circle $a$, this being subject to wear and requiring to be re-sharpened; since all wear results in a modification of the generator circle $a$, this deforms the corresponding cut profile.

The present invention has for its object to find a remedy for these drawbacks. It consists in providing the movement of the blank by means of a pair of ordinary guiding gears, the external gear of this pair being concentric with the external gear of the hypocycloidal pair to be cut, the internal gear effecting the drive of the work-carrier by means of a coupling member which ensures correspondence of the angular differences.

To this end, the work-carrier 10 is given a double movement: on the one hand a rotation of its axis parallel to itself about the general axis of the machine; on the other hand, a rotation proper about its own axis.

The first movement of rotation is effected by the shaft 11 of the work-carrier 10, which has its axis on an eccentric 12 driven from the general shaft 15.

The eccentricity of 12, and thus the radius of the movement of rotation of 11, has a value $c$ which is equal to the difference between the radii of the pitch-circles D and C.

In order to effect the movement of rotation of the work-carrier 10 about the eccentric 12, which forms its actual axis, the work-carrier 10 is driven by a pair of guiding gears 13 and 14. This pair, which may be as large as desired, has pitch-circles E and F, the ratio of the diameters of which is $$\frac{m-1}{m}$$

The internal gear 13 is driven by the general shaft 15 through the intermediary of an eccentric 16. The eccentricity $d$ of the eccentric 16 is equal to the difference between the radii of the circles F and E. The guiding gear 13 rolls over the gear 14, which is fixed.

By operating in this way, instead of the movement of the work-piece M to be cut being effected by means of a pair of gears having the same pitch-circle diameters as the circles C and D, this movement is obtained by a pair of gears 13 and 14, the diameters of which may be as large as may be desired, only the ratio of these diameters, namely $$\frac{m-1}{m}$$

being retained. These gears may thus have a precision which is compatible with that required for the finished piece so as to comply with the required conditions of fluid-tightness at the contact of the sets of teeth $a$ and $b$.

The coupling of the work-carrier 10 with the guiding gears 13 and 14 is obtained by means of a device forming an articulated parallelogram, such as crank-arms 17 having two axes pivoted respectively on the two members to be coupled together. These crank-arms 17 are arranged in such a manner that when the guiding gear 13 rotates through an angle $\alpha$ about its centre $O_2$, such that if $O—O_2$ represents the eccentricity $d$, the work-carrier 10 rotates about its centre $O_1$ through the same angle $\alpha$. To this end, the crank-arms 17 are respectively coupled to the guiding gear 13 and to the work-carrier 10 in such manner that their length G—H is equal to $O_1—O_2$, and that they remain constantly parallel to $O_1—O_2$.

The drive of the work-carrier 10 is thus effected by the articulated parallelogram $O_1—O_2—H—G$, in which the side G—H of unvarying length remains constantly parallel to $O_1—O_2$.

One form of construction of the crank-arms 17 is shown in detail in Figs. 5 and 6. The crank-arm proper 17 is provided with two oppositely-facing studs 18 and 19. The stud 18 is inserted in an orifice 20 of the support 10, whilst the stud 19 is inserted in the orifice 21 of the guiding gear 13.

When this guiding gear is driven by rotation of the eccentric 16 of the shaft 15 and rolls in the external gear 14, it drives the work-carrier 10 and the work-piece M through the assembly 17—18—19, and thus gives the desired movement of generation to the work-piece.

The drive of the support 10 may be effected by one or a number of crank-arms such as 17. However, it should be observed that when each crank-arm passes through the plane of symmetry of the eccentrics, defined by $O—O_1—O_2$, there is a risk of a dead-centre which could possibly result in jamming. One means of avoiding this risk consists in employing a number of crank-arms so arranged that there is always one of them which is located in an angle less than a given angle on each side of the most favourable plane, which is the plane normal to the plane of the eccentrics. In the example of construction shown diagrammatically in Fig. 7, the maximum angle is chosen to be equal to $$\frac{\pi}{8}$$

and four crank-arms are provided at the positions 22, 23, 24 and 25, along the radial directions of angular displacements which are multiples of $$\frac{2\pi}{8}$$

namely: between 22 and 23:

$$\frac{2\pi}{8}$$

between 23 and 24:

$$\frac{4\pi}{8}$$

between 24 and 25:

$$\frac{6\pi}{8}$$

In addition to control of the movement of the blank, the generation is effected by a tool 26 which moves parallel to the axis of the work-piece to be machined. This tool may be a milling cutter or a grinding wheel having its axis at right angles to the axis of the work-piece M to be cut and moving with an alternating motion parallel to the said work-piece.

On the other hand, the shaping carried out by a tool which moves parallel to the axis of the blank enables the tool to be sharpened without causing any modification of the profile of the teeth. The tool, grinding wheel or milling cutter, may thus be sharpened whenever this is found necessary, the error introduced by this sharpening being corrected by displacement of the axis of the tool.

It will be observed that in the generation of the profile of the internal gear C, which profile is defined by the envelope of the curve $a$, only the useful fraction $e—f—g$ of the curve $a$ (see Fig. 2) is employed. This useful fraction is defined by the two tangents drawn from the centre of $a$ to the pitch-circle D: these are the extreme positions attained by the normal to the envelope, the instantaneous centre of rotation being the point of contact of the pitch-circles C and D (point K).

The result of this is that it is only necessary to give the tool 26 (see Fig. 8) the profile which corresponds only to the arc $e—f—g$. This tool 26 is a milling cutter or a grinding wheel rotating on a shaft 27 perpendicular to the axis of the support of the blank, and receiving a movement of translation having an amplitude equal to the thickness of the work-piece M to be cut. The diameter of the tool is then immaterial and may have any desired value.

It should be observed that, in accordance with the method of cutting hypocycloidal gears in accordance with the invention, it is not necessary that the generator curve $a$ should be a circle. It is only necessary that this curve should have an axis of symmetry which passes through the centre of the base D, that the slope of its tangent varies in the same sense along the length of the active profile on the same side of the plane of symmetry and that it is inscribed in an angle less than $$\frac{2\pi}{m}$$

where $m$ is the number of teeth in the gear A.

Any curve which complies with these conditions may be utilised for the production of conjugate gears.

What I claim is:

1. A device for presenting to a cutting tool, gears with hypocycloidal generation of the type in which an internal gear with $(m—1)$ teeth is associated with an external gear with $m$ teeth, the two gears being constantly in engagement with their teeth tangential at the points of contact, comprising a shaft having first and second successive eccentric portions, said shaft carrying a fixed wheel with internal spur teeth, the first eccentric portion carrying a wheel with external teeth engaging with the said fixed wheel with internal teeth, the second portion being eccentric by the difference of the diameters of the hypocycloidal gears and carrying the blank support, and pivoted crank arms of fixed length coupling the support to the wheel with external teeth.

2. A device for presenting to a cutting tool, gears with hypocycloidal generation of the type in which an internal gear with $(m—1)$ teeth is associated with an external gear with $m$ teeth, the two gears being constantly in engagement with their teeth tangential at the points of contact, comprising a shaft having first and second successive eccentric portions, the said shaft carrying a fixed wheel with internal spur teeth, the first eccentric portion carrying a wheel with external teeth engaging with the fixed wheel with internal teeth, the second portion being eccentric by the difference of the diameters of the hypocycloidal gears and carrying the blank support, and a plurality of pivoted crank arms of equal lengths, spaced apart angularly by whole multiples of $$\frac{\pi}{4}$$

coupling the support to the wheel with external teeth.

References Cited in the file of this patent

UNITED STATES PATENTS

| | | |
|---|---|---|
| 1,485,900 | Wingquist | Mar. 4, 1924 |
| 1,798,059 | Bilgram et al. | Mar. 24, 1931 |
| 2,038,897 | Geny | Apr. 28, 1936 |
| 2,421,463 | Noreyko | June 3, 1947 |
| 2,665,612 | Nubling | Jan. 12, 1954 |